United States Patent
Fujiwara et al.

(10) Patent No.: US 7,481,123 B2
(45) Date of Patent: Jan. 27, 2009

(54) LOAD AND LOAD DIRECTION DETECTING APPARATUS

(75) Inventors: Noboru Fujiwara, Toyota (JP); Akira Matsuura, Osaka (JP)

(73) Assignees: Toyoda Iron Works Co., Ltd., Toyota-shi, Aichi-ken (JP); Panasonic Corporation, Kadoma-shi, Osaka (JP)

(*) Notice: Subject to any disclaimer, the term of this patent is extended or adjusted under 35 U.S.C. 154(b) by 0 days.

(21) Appl. No.: 12/000,275

(22) Filed: Dec. 11, 2007

(65) Prior Publication Data
US 2008/0250874 A1 Oct. 16, 2008

(30) Foreign Application Priority Data
Apr. 13, 2007 (JP) ............................. 2007-106392
Sep. 19, 2007 (JP) ............................. 2007-242861

(51) Int. Cl.
*G01L 1/04* (2006.01)

(52) U.S. Cl. ............... 73/862.627; 73/763; 73/862.381; 73/862.391; 73/862.621; 73/862.625

(58) Field of Classification Search .................... 73/763, 73/862.381, 862.391, 862.621, 862.625, 73/862.627, 862.628
See application file for complete search history.

(56) References Cited

U.S. PATENT DOCUMENTS

| | | | | |
|---|---|---|---|---|
| 6,038,933 A | * | 3/2000 | Meyer | 73/862.045 |
| 7,049,529 B2 | * | 5/2006 | Vogel et al. | 177/144 |
| 7,076,990 B2 | * | 7/2006 | Yoshikuwa | 73/1.13 |
| 7,228,758 B2 | * | 6/2007 | Fujiwara | 74/512 |
| 7,241,956 B1 | * | 7/2007 | Stimpson | 177/136 |
| 2008/0060452 A1 | * | 3/2008 | Fujiwara et al. | 73/862.381 |

FOREIGN PATENT DOCUMENTS

JP 6-207866 7/1994

* cited by examiner

*Primary Examiner*—Edward Lefkowitz
*Assistant Examiner*—Freddie Kirkland, III
(74) *Attorney, Agent, or Firm*—Finnegan, Henderson, Farabow, Garrett & Dunner, LLP

(57) ABSTRACT

A load and load direction detecting apparatus is so constructed that a shear force acts on a cylindrical strain body when a load W is applied from a displacing member to a case member in a direction perpendicular to an axis of the strain body. Thus, the strain body deforms readily. Consequently, detecting sensitivity of the value of load W is improved, which is calculated by a first differential amplifier (load value calculating unit) based on an output voltage output from a first bridge. A direction ($\theta_W$) of the load W is calculated by a load direction calculator (load direction calculating unit) based on an output voltage output from a second bridge, and the output voltage output from the first bridge.

7 Claims, 10 Drawing Sheets

LOAD AND LOAD DIRECTION DETECTING APPARATUS

The present application is based on Japanese Patent Application No. 2007-242861, and content thereof is incorporated therein.

TECHNICAL FIELD

1. Field of the Invention

The present invention relates to a load and load direction detecting apparatus for detecting a value i.e., magnitude and a direction of a load applied to any of various members or apparatuses. The detection apparatus is used, for example, to detect a value and a direction of a depressing load applied to a vehicle pedal etc., to detect a value and a direction of a load applied to a vehicle parking brake lever, to detect a seat surface load and a load direction of a vehicle seat, to detect a value and a direction of a vehicle body load or a wheel load applied to a suspension, and to detect a value and a direction of a load applied to a lift apparatus, etc.

2. Description of the Prior Art

In general, a load detecting apparatus has a structure such as shown in FIGS. 12 to 14. FIG. 12 is a perspective view of a conventional load detecting apparatus, FIG. 13 is a development view of a strain body in a main sensor unit of the load detecting apparatus, and FIG. 14 is a circuit diagram of the load detecting apparatus. In FIGS. 12 to 14, a pair of circumferential direction strain detecting elements 2 and a pair of width direction strain detecting elements 3 are fixed to an outer circumferential surface of the strain body 1 of cylindrical shape. Also on the outer circumferential surface of the strain body 1, a bridge circuit such as shown in FIG. 14 is constructed, by electrically connecting the circumferential direction strain detecting elements 2, the width direction strain bodies 3, a power supply terminal 4, a GND terminal 5, and an output terminal 6 by a circuit pattern 7.

In the conventional load detecting apparatus thus constructed, when a compressive force acts on the strain body 1 of cylindrical shape in a direction parallel to an axis C, resistance values of the pair of width direction strain detecting elements 3 decrease and resistance values of the pair of circumferential direction strain detecting elements 2 increase. Because the power supply terminal 4, the GND terminal 5, the output terminal 6 and the circuit pattern 7 construct the bridge circuit 7, the pair of width direction strain detecting elements 3 and the pair of circumferential direction strain detecting elements 2 output signals from the output terminal 6 in accordance with the compressive force that acts on the strain body 1. As prior art document related to the invention of the present application, for example, Patent Document 1 (Japanese Unexamined Patent Publication No. H6-207866) is known.

However, in the conventional load detecting apparatus described above, a load is applied or acts in a direction parallel to the axis C of the strain body 1. Thus, the strain body 1 itself resists to deformation by the load, thereby making strain less likely to occur in the circumferential direction strain detecting elements 2 and the width direction strain detecting elements 3, so that sensitivity of the output signals is lowered. Also, a direction of the load applied to the main sensor unit cannot be detected, which limits application of the load detecting apparatus.

SUMMARY OF THE INVENTION

The present invention has been made with the above circumstances as a background, and an object thereof is to provide a load and load direction detecting apparatus which can improve the sensitivity of detection of the load applied to a main senor unit, and can detect a direction of the load applied to the main sensor unit.

For achieving the above object, a first aspect of the present invention is featured by a load and load direction detecting apparatus for detecting a load value and a load direction, comprising: (a) a main sensor unit which includes (i) a cylindrical strain body provided with, on a circumferential surface, at least four strain detecting elements spaced in a circumferential direction, and (ii) a first member and a second member respectively fixed and supporting respective ends of the strain body so that a load directed perpendicular to an axis of the strain body acts on one of the respective ends of the strain body and a reaction force acts on the other end of the respective ends; (b) a load value calculating unit which calculates the load value using a first output signal based on a signal output from a first bridge including at least a pair of strain detecting elements positioned relative to the axis, of the at least four strain detecting elements; and (c) a load direction calculating unit which calculates the load direction using (i) a second output signal based on a signal output from a second bridge constituted of a pair of strain detecting elements positioned relative to the axis of the at least four strain detecting elements and two fixed resistors, and (ii) the first output signal.

With the load and load direction detecting apparatus according to the first aspect of the present invention, the load is applied from one of the first member and the second member to the other of them in a direction perpendicular to the axis of the strain body, so that a shear force acts on the cylindrical strain body. Therefore, in comparison with the conventional structure in which a load is applied cylindrical strain body in the axial direction, the strain body readily deforms or deflects to readily generate a strain in the strain detecting elements.

The detection sensitivity of the load is thus improved, which is calculated by the load calculating unit using the first output signal based on the signal output from the first bridge. Also, the direction of the load is calculated by the load direction calculating unit using a second output signal based on the signal output from the second bridge and the above first output signal Preferably, the first bridge is constituted of a third strain detecting element and a second strain detecting element, and a fourth strain detecting element and a first strain detecting element. The first output signal corresponds to a potential difference arising between a potential generated between the third strain detecting element and the second strain detecting element, and a potential generated between the fourth strain detecting element and the first strain detecting element, when a power supply voltage is applied to between the third strain detecting element and the fourth strain detecting element, and between the second strain detecting element and the first strain detecting element.

Accordingly, in the first bridge constructed by the third strain detecting element and second strain detecting element, and the fourth strain detecting element and the first strain detecting element, when the power supply voltage is applied between the third strain detecting element and the fourth strain detecting element, and between the second strain detecting element and the first strain detecting element, the first bridge operates as below. That is, the potential difference arising between the potential generated between the third strain detecting element and the second strain detecting element, and the potential generated between the fourth strain detecting element and the first strain detecting element, or an amplified value of the potential difference is output, as the first output signal. The load value calculating unit calculates the load value based on the first output signal Preferably, the second bridge is constituted of a fourth strain detecting element and a first strain detecting element, and two fixed resistors. The second output signal corresponds to a potential difference arising between a potential generated between the fourth strain detecting element and the first strain detecting element, and a potential generated between the two fixed resistors, when the power supply voltage is applied to between the fourth strain detecting element and one of the fixed resistors and between the first strain detecting element and other of the fixed resistor.

Accordingly, in the second bridge constructed by the fourth strain detecting element and the first strain detecting element, and the two fixed resistors, when the power supply voltage is applied between the fourth strain detecting element and one of the fixed resistors, and between the first strain detecting element and the other of them, the second bridge operates as below. That is, the potential difference arising between the potential generated between the fourth strain detecting element and the first strain detecting element, and the potential generated between the two fixed resistors, or an amplified value of the potential difference, is output as the second output signal. Thus, the load direction calculating unit calculates the direction of the load based on the first output signal and the second output signal.

Preferably, the at least four strain detecting elements are arranged on the cylindrical strain body equidistantly in a circumferential direction. In response to the load applied, the second strain detecting element and the fourth strain detecting element vary in an opposite direction to the third strain detecting element and the first strain detecting element, in resistance values thereof.

With this structure, the first output signal based on the signal output from the first bridge varies according to the variation of the load value regardless of the variation of the load direction. The second output signal based on the signal output from the second bridge varies according to the variation of the load direction.

BEST MODE FOR CARRYING OUT THE INVENTION

In the following, a load and load direction detecting apparatus 10 according to one embodiment of the present invention will be explained with reference to the drawings.

EMBODIMENT 1

Figure 1:
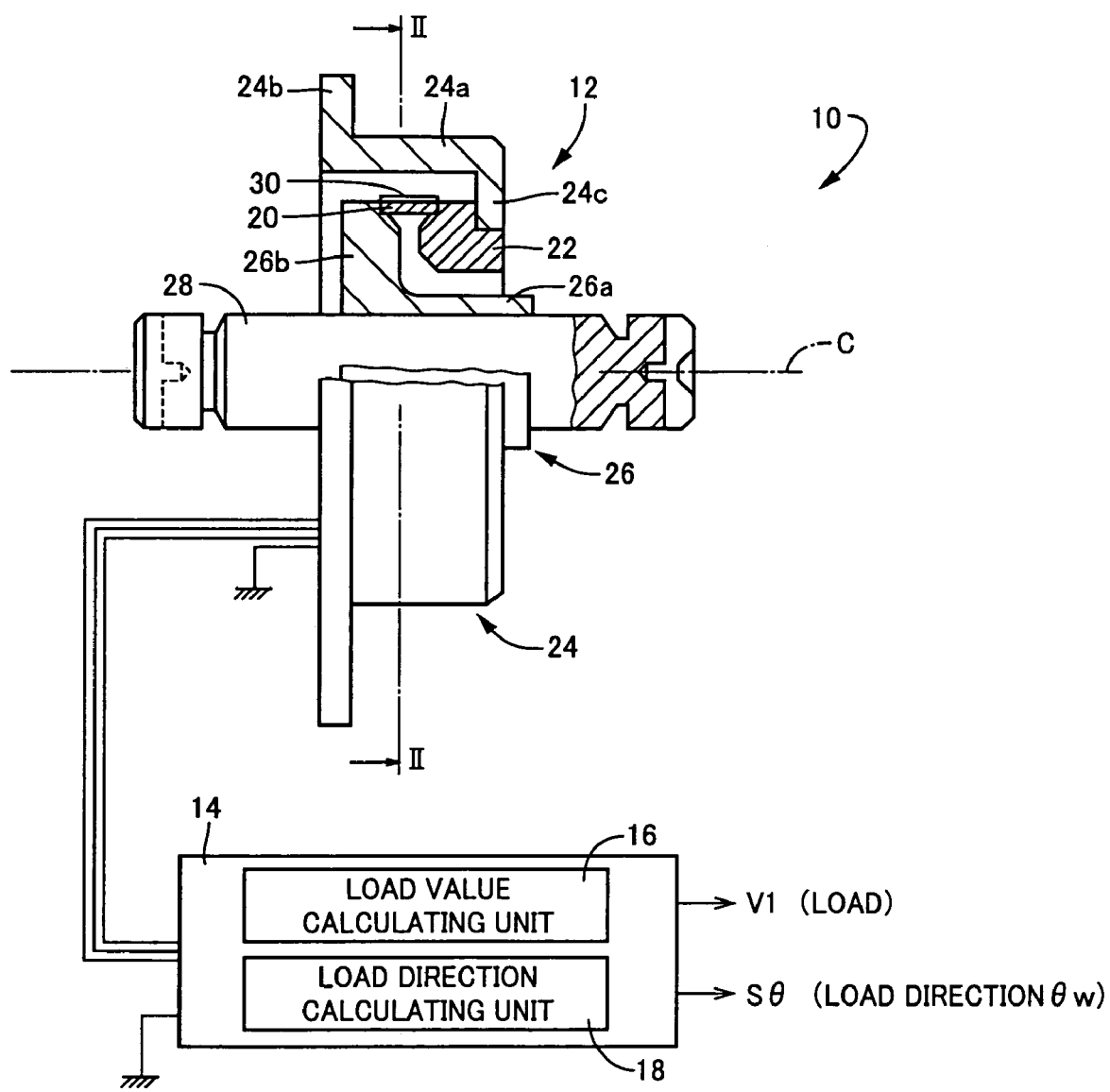
FIG. 1 is a view for explaining a structure of a load and load direction detecting apparatus according to one embodiment of the present invention.

FIG. 1 is a view for explaining a structure of the load and load direction detecting apparatus (referred to hereinafter as "detecting apparatus") 10. In FIG. 1, the detecting apparatus 10 is constructed by a main sensor unit 12 constituted of a plurality of parts for detecting a load W, and a detecting unit 14 for detecting the value of load W applied to the main sensor unit 12 and a direction $\theta_W$ of the load W.

The detecting unit 14 has a load value calculating unit 16 and a load direction calculating unit 18. The load value calculating unit 16 calculates the load W based on an output voltage V1 of a first bridge circuit B1 that includes four strain resistance elements HR1, HR2, HR3 and HR4 disposed in the main sensor unit 12. The load direction calculating unit 18 calculates the direction of the load W based on an output voltage V2 of a second bridge circuit B2 that includes two of the four strain resistance elements HR1, HR2, HR3 and HR4 disposed in the main sensor unit 12, and two fixed resistors SR1 and SR2.

Figure 2:
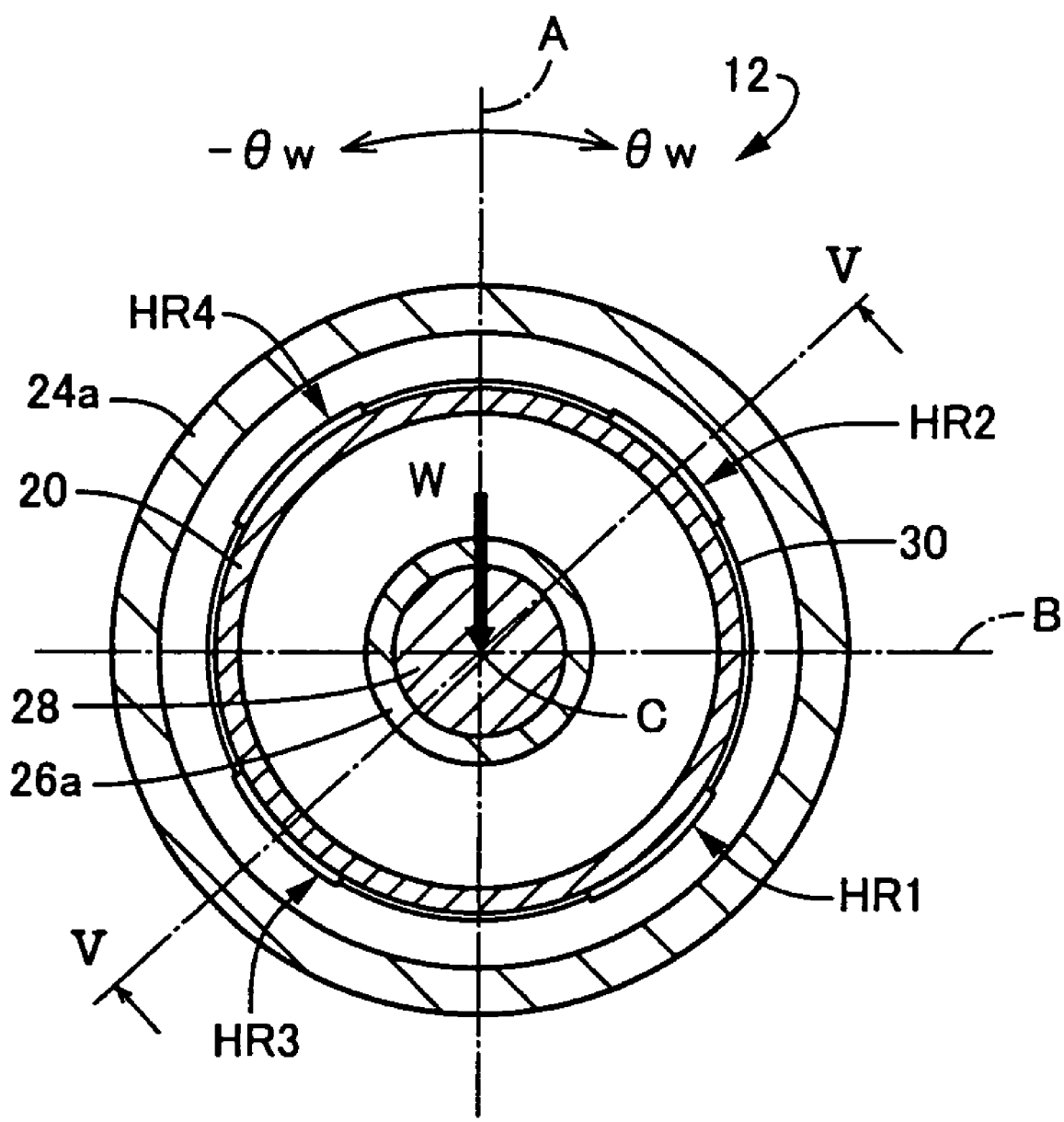
FIG. 2 is a longitudinal sectional view taken along a line 2-2 of FIG. 1 for explaining a structure of a main sensor unit in the embodiment of FIG. 1.

In FIG. 1, the main sensor unit 12 is shown with a portion thereof broken. FIG. 2 is a sectional view taken along a line II-II of the main sensor unit 12 shown in FIG. 1. As shown in FIG. 1 and FIG. 2, the main sensor unit 12 has a cylindrical strain body 20, a case member (claimed first member) 24, a displacing member (claimed second member) 26, and a load transmitting pin 28, fitted into the displacing member 26. In order to receive a reaction force, the case member 24 is fixed or mounted onto any member, and is fixed to one axial end of the strain body 20 via an annular washer 22 to support it. The displacing member 26 fixed to the other axial end of the strain body 20 to support it is applied or receives the load W. These members are disposed in a concentric manner or coaxial with an axis C.

The strain body 20, the washer 22, the case member 24, the displacing member 26, and the load transmitting pin 28 are all formed of a metal, such as ferritic stainless steel. The case member 24 has a cylindrical tube portion 24a, an outwardly directed flange portion 24b outwardly protruding integral with the cylindrical tube portion 24a, and an inwardly directed flange portion 24c inwardly protruding integral with the cylindrical tube portion 24a.

The annular washer 22 is fixed to an inner circumferential edge of the inwardly directed flange portion 24c. An outer circumferential portion of the washer 22 is fitted to an opening of the strain body 20 at one axial end (right end) and fixed by welding to an entire circumference or a portion of the entire circumference of the opening. The displacing member 26 has a tubular cylindrical portion 26a into which the load transmitting pin 28 is centrally inserted, and a disk-shaped mounting portion 26b outwardly protruding integral with the tubular cylindrical portion 26a at one axial end (left end) thereof. The mounting portion 26b closing an opening of the strain body 20 at the other axial end (left end) is fitted at an outer circumferential portion thereof, and is fixed to an entire circumference or a portion thereof by welding.

Because the strain body 20 is larger than the cylindrical portion 26a of the displacing member 26 in diameter, and the cylindrical tube portion 24a of the case member 24 is larger than the strain body 20 in diameter, the case member 24 functions as a case for the main sensor unit 12. The strain body 20, the washer 22, and the displacing member 26 are housed in the case member 24.

In the main sensor unit 12 thus constructed, the other axial end of the strain body 20 is supported by the mounting portion 26b of the displacing member 26, and the one axial end of the strain body 20 is supported by the inwardly directed flange portion 24c of the case member 24 via the washer 22. That is, the respective axial ends of the strain body 20 are fixed to and supported by the displacing member 26 as the second member and the case member 24 as the first member. Thus, in the state where the outer circumferential surface of the case member 24 is positionally fixed, when the load W is applied in a direction perpendicular to the axis C via the load transmitting pin 28 centrally fitted in the displacing member 26, a stress in a shear direction acts on the strain body 20.

Figure 5:
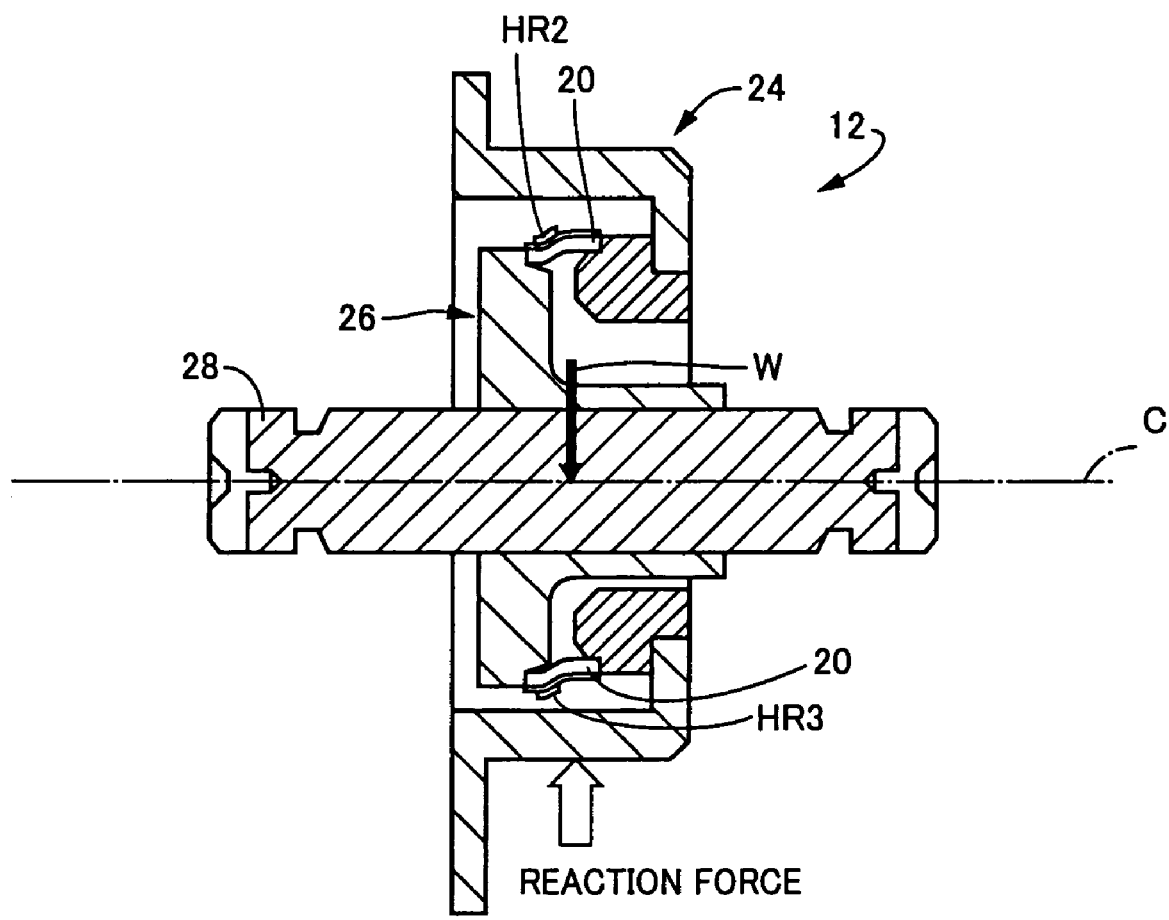
FIG. 5 is a sectional view taken along a line 5-5 of FIG. 2 for explaining a deformation of the strain body upon application of the load to the main sensor unit shown in FIG. 1 and FIG. 2.

In the main sensor unit 12 of the present embodiment, in comparison with a case where a load acts in the axis C direction of the strain body 20, strain is generated more readily in the strain body 20, so that the sensitivity of the output signal is improved. FIG. 5 is sectional view taken along a line V-V of FIG. 2, and shows a strain with an exaggeration generated in the strain body 20 by the application of the stress in the shear direction.

Figure 3:
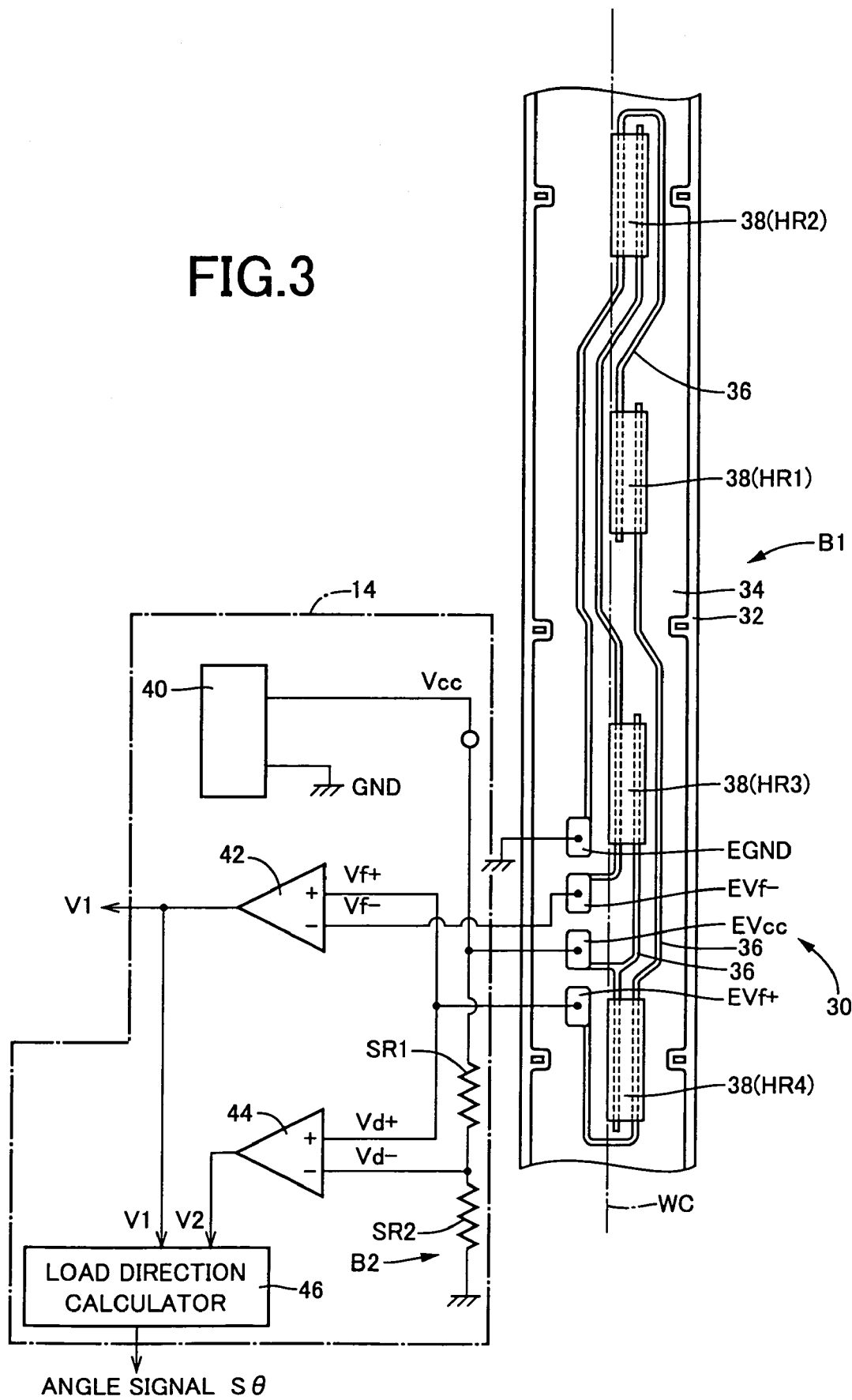
FIG. 3 shows a detecting circuit fixed to an outer circumferential surface of a strain body of the main sensor unit in the embodiment of FIG. 1 in a developed state, and a structure of a measuring circuit connected to the detecting circuit.

To detect the strain in the strain body 20, a membrane-like or film-like strain detecting circuit 30 as shown in FIG. 3 in which a predetermined longitudinal band-like circuit pattern is formed is fixed onto the outer circumferential surface of the strain body 20 by an adhesive agent, etc. The strain detecting circuit 30 has a base film 32, an insulating layer 34, a conductive film 36 of a predetermined pattern, and a strain resistance film 38. The base film 32 is formed of a metal foil of stainless steel, nickel or copper, etc., or of a heat resistant resin, such as a polyimide resin.

The insulating layer 34, formed of glass or a heat resistant resin, is fixed across an entire surface of the base film 32. The conductive film 36 of the predetermined pattern is formed of aluminum, nickel or silver, etc., that is fixed onto the insulating layer 34 by printing, sputtering or other technique. The strain resistance film 38 is formed of a thick film resistance material or a metal resistance material of tungsten, ruthenium, etc., of a predetermined pattern that is likewise fixed onto the insulating layer 34 by printing, sputtering, or other technique.

The strain detecting circuit 30 can be formed with a state directly fixed to the outer circumferential surface of the strain body 20 by processes to be described below. That is, firstly, a glass paste (not shown) is printed onto an outer circumferential surface of a cylindrical seamless stainless steel tube (not shown), that is to be the material for the strain body 20 with a thickness of approximately 1 mm. Thereafter, the stainless steel tube is baked at approximately 850° C. for approximately 10 minutes to form the insulating layer 34.

Next, a conductive paste (not shown) having silver as a main component and positioned on the outer surface of the stainless steel tube is printed, followed by baking the stainless steel tube at approximately 850° C. for approximately 10 minutes. Power supply terminals EVcc and EGND, output terminals EVf+ and EFf-, and the conductive film 36 of predetermined pattern are thereby formed on the outer circumferential surface of the stainless steel tube.

Then, a metal glaze resistive paste (not shown), after being printed onto the outer circumferential surface of the stainless steel tube, is dried at approximately 130° C. for approximately 10 minutes. Thereafter, the stainless steel tube is baked at approximately 850° C. for approximately 10 minutes to form the four strain resistance elements HR1, HR2, HR3, and HR4. Thus, the stainless steel tube is manufactured to the strain body 20.

The conductive film 36 and the strain resistance film 38 of the predetermined patterns construct a pair of power supply terminals EVcc and EGND, the first bridge circuit B1 which is a full bridge including the four strain resistance elements HR1, HR2, HR3 and HR4, and output terminals EVf+ and EVf- of the first bridge circuit B1. The four strain resistance elements HR1, HR2, HR3 and HR4 are positioned on the longitudinal band-like strain detecting circuit 30 to be shifted to one axial side from a width center WC. On the strain detecting circuit 30 wound and adhered around the outer circumferential surface of the strain body 20, the strain resistance elements HR1, HR2, HR3 and HR4 are arranged substantially equidistantly in the circumferential direction, that is equiangularly about the axis C.

As shown in FIG. 2, in representing a deflection angle of the load W about the axis C, that is a central direction, i.e., a reference direction A of the load W is defined as zero degrees. Under such definition, in the present embodiment, the strain resistance element HR2 is disposed over the position of substantially 45 degrees clockwise, that is around this position. The strain resistance element HR1 is disposed over the position of substantially 135 degrees clockwise, the strain resistance element HR3 is disposed over the position of substantially 225 degrees clockwise, and the strain resistance element HR4 is disposed over the position of substantially 315 degrees clockwise, respectively. Thus, the strain resistance elements HR3 and HR4, and the strain resistance elements HR1 and HR2 are respectively positioned at the left and the right side of the reference direction A of the load W. The strain resistance elements HR4 and HR2, and the strain resistance elements HR3 and HR1 are respectively positioned at an upper side (upstream side in the direction of the load W) and a lower side (downstream side in the direction of the load W) of a line B orthogonal to the reference direction A of the load W.

Figure 4:
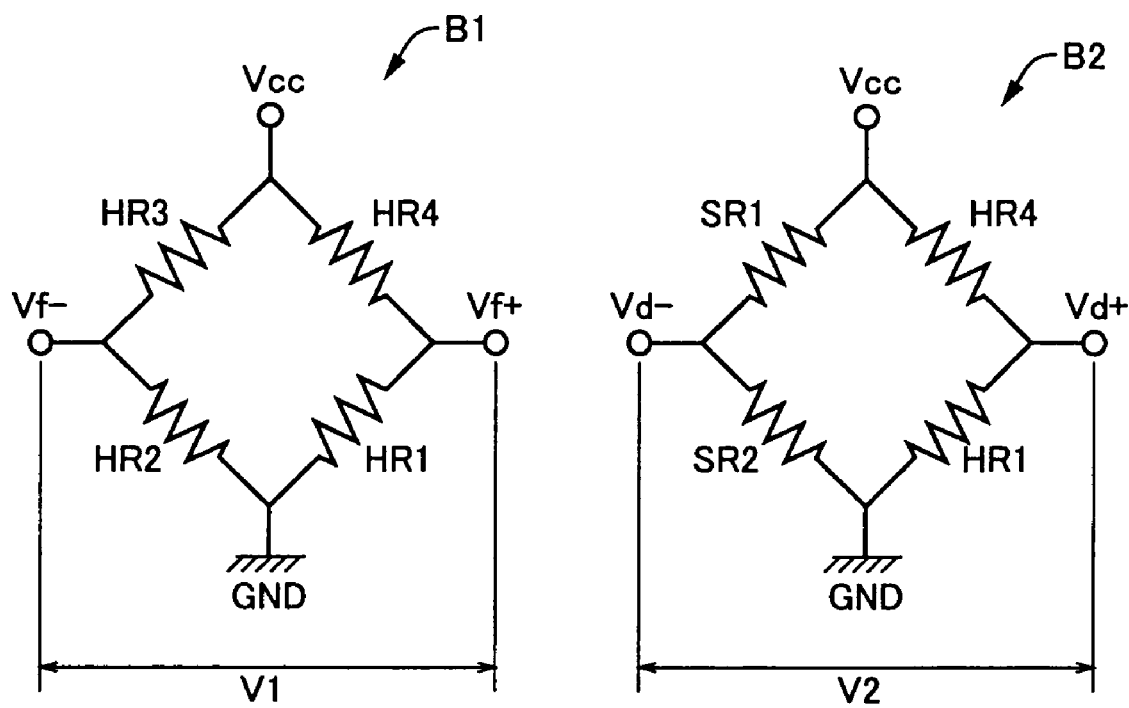
FIG. 4 shows an equivalent circuit diagram for explaining a first bridge and a second bridge constructed in the detecting circuit of FIG. 3 and a detection unit.

In FIG. 3, the detecting unit 14 is provided with a power supplying apparatus 40 that outputs a fixed DC voltage or AC voltage, a pair of output terminals of which are connected to the power supply terminals EVcc and EGND, respectively. The detecting unit 14 is also provided with two fixed resistors SR1 and SR2 serially connected between the pair of output terminals of the power supplying apparatus 40. Two strain resistance elements, among the four strain resistance elements HR1, HR2, HR3 and HR4, positioned symmetrical to the axis C (in the present embodiment, the strain resistance elements HR1 and HR4) and the two fixed resistors SR1 and SR2 externally connected construct a second bridge circuit B2. FIG. 4 shows equivalent circuits of the first bridge B1 and the second bridge B2 which is the full bridge.

In FIG. 3, the detecting unit 14 is provided with a first differential amplifier 42 connected to the output terminals EVf+ and EVf− of the first bridge B1, a second differential amplifier 44 connected to the output terminals EVd− and EVd+ (=EVf+) of the second bridge B2, and a load direction calculator 46. The load direction calculator 46 calculates the direction of the load W based on an output signal V1 of the first differential amplifier 42 and an output signal V2 of the second differential amplifier 44.

In the following, the operations of the first bridge B1 and the second bridge B2 in FIG. 3 and FIG. 4 will be described. Resistance values of the four strain resistance element HR1, HR2, HR3 and HR4 are represented by R1, R2, R3 and R4, and variation amounts of these resistance values upon application of strain are represented by ΔR1, ΔR2, ΔR3 and ΔR4, respectively. The resistance value of the fixed resistors SR1 and SR2 are represented by R0 and R0. The respective resistance values R1, R2, R3 and R4, and R0 are regarded to be equal, and an amplified rate of the first differential amplifier 42 and the second differential amplifier 44 are regarded to be 1.

Here, the first output signal of the first differential amplifier 42, that is, the output voltage V1 of the first bridge B1 is approximated by a following formula (1), and the second output signal of the second differential amplifier 44, that is, the output voltage V2 of the second bridge B2 is approximated by a following formula (2).

$$V1 = [(\Delta R1/R1) - (\Delta R2/R2) + (\Delta R3/R3) - (\Delta R4/R4)]Vcc/4 \quad (1)$$

$$V2 = [(\Delta R1/R1) - (\Delta R4/R4)]Vcc/4 \quad (2)$$

In the first bridge B1, the strain resistance elements with the same trend of resistance variation by strain upon application of the load W are positioned at opposing sides. That is, as shown in FIG. 5, when the load W is applied, both the strain resistance elements HR2 and HR4 positioned at the upper side of the line B receive compressive stresses in the width direction of the strain body 20 to exhibit a decreasing trend in the resistance values. Here, FIG. 5 is a sectional view taken along a line V-V and shows a strain deformation of the strain body 20 resulted from the load W with exaggeration.

On the other hand, both the strain resistance elements HR1 and HR3 positioned at the lower side of the line B receive a tensile stress in the width direction of the strain body 20 to exhibit an increasing trend in the resistance values. In the first bridge B1, among the two pairs of opposing sides, the strain resistance elements HR2 and HR4 are positioned at one pair of opposing sides, and the strain resistance elements HR1 and HR3 are positioned at the other pair of opposing sides.

In the first bridge B1 thus constructed, upon application of the load W, the midpoint potentials Vf+ and Vf− of the pair of half bridges, positioned at cross positions relative to the reference direction A of the load W and the direction perpendicular thereto, vary in opposite directions. Consequently, the output voltage V1 varying with high sensitivity relative to the value of load W is obtained.

The first bridge B1 arranged as described above has a characteristic of being insensitive to variations of the angle $\theta_W$ of the applied load W, in a range in which the variations trends of the resistance values relative to the load W are maintained. This characteristic has been confirmed through an experiments by the present inventors to be described below. Thus, the first output signal of the first differential amplifier 42 indicates the load W, and the first differential amplifier 42 constructs a portion or the entirety of the load value calculating unit 16.

Figure 6:
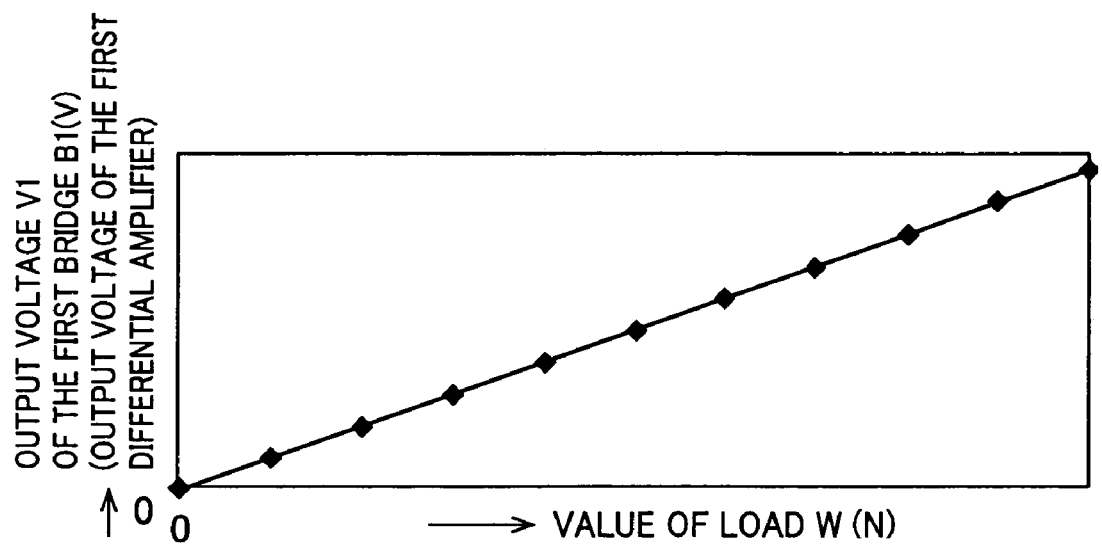
FIG. 6 is a characteristics diagram for explaining a variation of an output voltage relative to the load in the first bridge shown in FIG. 3 and FIG. 4.
Figure 7:
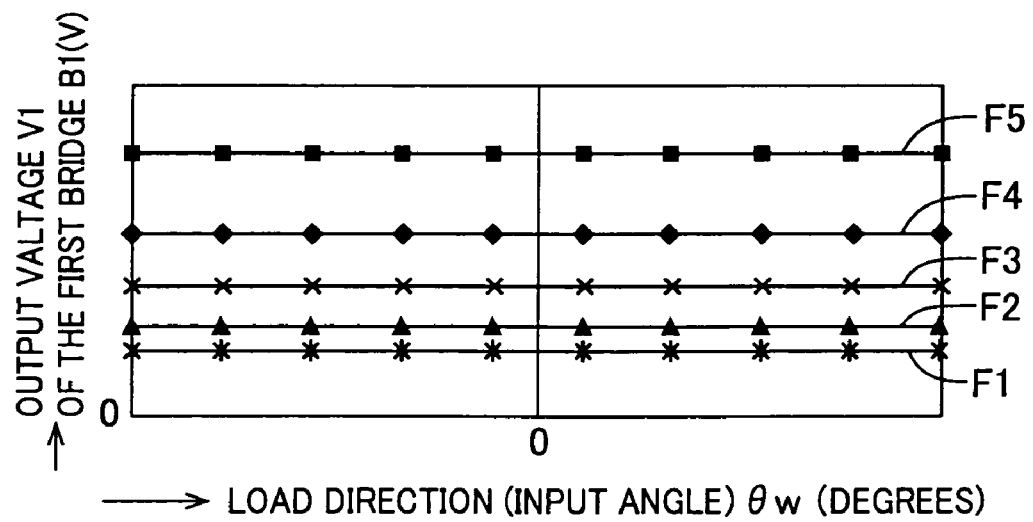
FIG. 7 is a characteristics diagram for explaining, in the first bridge shown in FIG. 3 and FIG. 4, variations of the output voltage relative to the load direction with the load as a parameter.

FIG. 6 and FIG. 7 show results of experiments by the present inventors. FIG. 6 shows values of the output voltage V1 measured when, in a trial-manufactured first bridge B1, a value of the load W applied to the displacing member 26 in the direction perpendicular to the axis C of as shown in FIG. 2 is increased. Owing to the obtained output voltage V1 proportional to the load W, by storing the relationship between the load W and the output voltage V1 in advance, the load W can be measured based on the output voltage V1 using this relationship.

FIG. 7 shows values of the output voltage V1 measured when, in respective states where each of five kinds of fixed load values F1, F2, F3, F4 and F5 is applied as the load W, the angle (direction) $\theta_W$ of the load application is varied. The load values successively increase from the smallest one (F1) to the largest one (F5). This result shows that, for each of five loads, even when the angle (direction) $\theta_W$ of the load application is varied, the output voltage V1 does not vary. Thus, even the load W varying in the angle $\theta_W$ can be measured at high precision.

Figure 8:
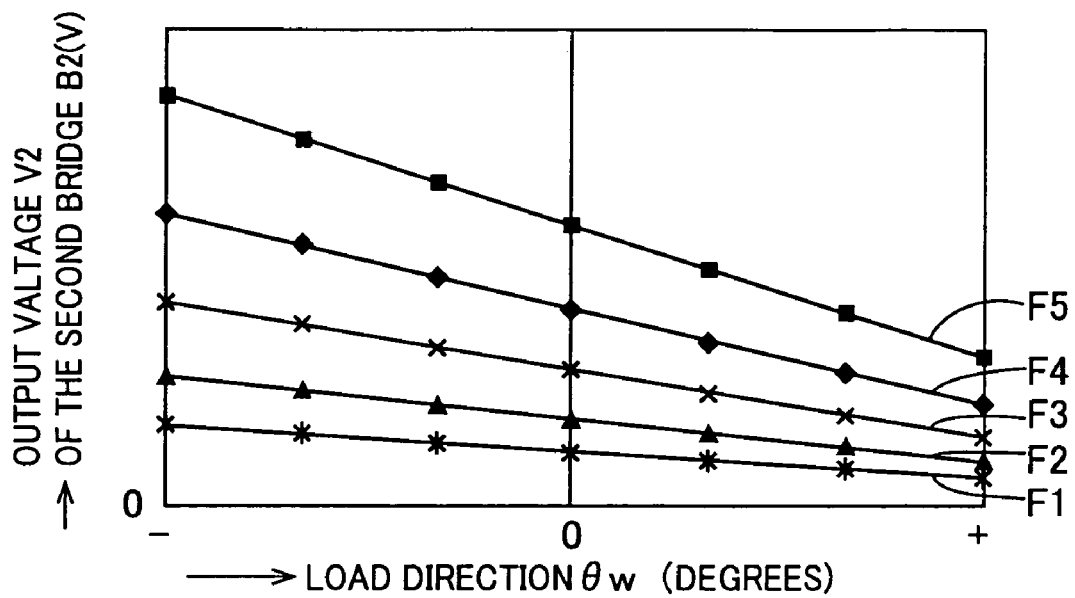
FIG. 8 is a characteristics diagram for explaining, in the second bridge shown in FIG. 3 and FIG. 4, variations of the output voltage relative to the load direction with the load as a parameter.

The second bridge B2 is a full bridge constructed by two half bridges. One half bridge is formed by the serially connected strain resistance elements HR4 and HR1, or that positioned at cross positions relative to the strain resistance elements HR2 and HR3 in the first bridge B1. Other half bridge is constructed by the serially connected fixed resistors SR1 and SR2. FIG. 8 shows, for a trial-manufactured second bridge B2, measured values of the output voltage V2 when, in respective states where each of five kinds of fixed load values F1, F2, F3, F4 and F5 are applied to the displacing member 26 as the load W in the direction perpendicular to the axis C as shown in FIG. 2, the angle (direction) $\theta_W$ of the load application is varied.

Apparent from FIG. 8, the output voltage V2 is proportional to the value of load W, and varies proportionately with the angle (direction) $\theta_W$ of the applied load W. Thus, using a factor β (a function of the output voltage V1) and a constant α determined through an experiment for normalization regarding to the load W, a relationship expressed by the following formula (3) is obtained. With this relationship, the angle (direction) $\theta_W$ of the applied load is calculated based on the output voltage V2. The load direction calculator 46, constructing a portion or an entirety of the load direction calculating unit 18, calculates an angle signal Sθ that expresses the angle (direction) $\theta_W$ of the applied load W by a formula (3) based on the output voltage V1 of the first bridge B1 and the output voltage V2 of the bridge B2 for thereby outputting them. The constant α is not necessarily be fixed but may be corrected according to the value of V1, etc., as necessary.

$$\theta_W = \beta \times V2 - \alpha \text{ (where } \alpha = \text{constant; } \beta = f_2(V1)) \quad (3)$$

As described above, the detecting apparatus 10 according to the present embodiment is arranged so that a shear force acts on the cylindrical strain body 20, when the load W is applied from the displacing member 26 to the case member 24 in the direction A perpendicular to the axis C of the strain body 20. Thus, in comparison with the conventional structure in which a load is applied to the cylindrical strain body 20 along the direction of the axis C, the strain body 20 readily deforms to readily generate the strain at the strain resistance elements HR1 to HR4.

Thus, the detection sensitivity of the load W represented by the output voltage V1 which is the first output signal is improved, which is calculated by the first differential amplifier 42 (load value calculating unit 16) based on the signal output from the first bridge B1. Also, the direction $\theta_W$ of the load W is calculated, by the load direction calculator 46 (load direction calculating unit 18) based on the output voltage V2 and the output voltage V1. Here, the output voltage V2 is the second output signal calculated by the second differential amplifier 44 based on the signal output from the second bridge B2. The output voltage V1 is the first output signal output from the first differential amplifier 42.

Also with the detecting apparatus 10 according to the present embodiment, the first bridge B1 is constructed by the third strain resistance element HR3 and the second strain resistance element HR2, and the fourth strain resistance element HR4 and the first strain resistance element HR1. The output voltage V1 is the potential difference arising between the potential generated between the third strain resistance element HR3 and the second strain resistance element HR2, and the potential generated between the fourth strain resistance element HR4 and the first strain resistance element HR1. This potential difference arises when the power supply voltage Vcc is applied to between the third strain resistance element HR3 and the fourth strain resistance element HR4, and between the second strain resistance element HR2 and the first strain resistance element HR1.

Thus, in the first bridge B1 constructed by the third strain resistance element HR3 and the second strain resistance element HR2, and the fourth strain resistance element HR4 and the first strain resistance element HR1, when the power supply voltage Vcc is applied to between the third strain resistance element HR3 and the fourth strain resistance element HR4, and between the second strain resistance element HR2 and the first strain resistance element HR1, the following operation is performed. That is, the potential difference arises between the potential generated between the third strain resistance element HR3 and the second strain resistance element HR2, and the potential generated between the fourth strain resistance element HR4 and the first strain resistance element HR1. The potential difference is output as the output voltage V1. The first differential amplifier 42 (load value calculating unit 16) calculates the value of load W based on the output voltage V1.

Also, with the detecting apparatus 10 according to the present embodiment, the second bridge B2 is constructed by the fourth strain resistance element HR4 and the first strain resistance element HR1, and the two fixed resistors SR1 and SR2. The output voltage V2 is the potential difference arising between the potential generated between the fourth strain resistance element HR4 and the first strain resistance element HR1, and the potential generated between the two fixed resistors SR1 and SR2. For detection of the output voltage V2, the power supply voltage Vcc is applied to between the fourth strain resistance element HR4 and the one fixed resistors SR1, and between the first strain resistance element HR1 and the other fixed resistor SR2.

Thus, in the second bridge B2 constructed by the fourth strain resistance element HR4 and the first strain resistance element HR1, and the two fixed resistors SR1 and SR2, when the power supply voltage Vcc is applied to between the fourth strain resistance element HR4 and the one fixed resistors SR1, and between the first strain resistance element HR1 and the other fixed resistor SR2, the following operation is performed. That is, the potential difference arises between the potential generated between the fourth strain resistance element HR4 and the first strain resistance element HR1, and the potential generated between the two fixed resistors SR1 and SR2, are output as the output voltage V2. The load direction calculator 46 calculates the direction $\theta_W$ of the load W based on the first output signal (output voltage V1) output from the first differential amplifier 42, and the second output signal (output voltage V2) output from the second differential amplifier 44.

Also, with the detecting apparatus 10 according to the present embodiment, the four strain resistance elements HR1, HR2, HR3 and HR4 are positioned on the outer surface of the cylindrical strain body 20 at positions spaced substantially equidistantly in the circumferential direction. In response to the applied load W, the second strain resistance element HR2 and the fourth strain resistance element HR4 vary in an opposite direction to the third strain resistance element HR3 and the first strain resistance element HR1 in the resistance values. Thus, the output voltage V1 of the first bridge B1 varies corresponding to the value of load W, regardless of the variation of the direction $\theta_W$ of the load W, and the output voltage V2 of the second bridge B2 varies corresponding to the load direction $\theta_W$. Consequently, a high sensitivity, that is a high measurement precision is obtained.

EMBODIMENT 2

Next, an other embodiment of the present invention will be described. In the following description, with members or portions common to the above embodiment 1 being added the same symbols, description thereof will be omitted.

Figure 9:
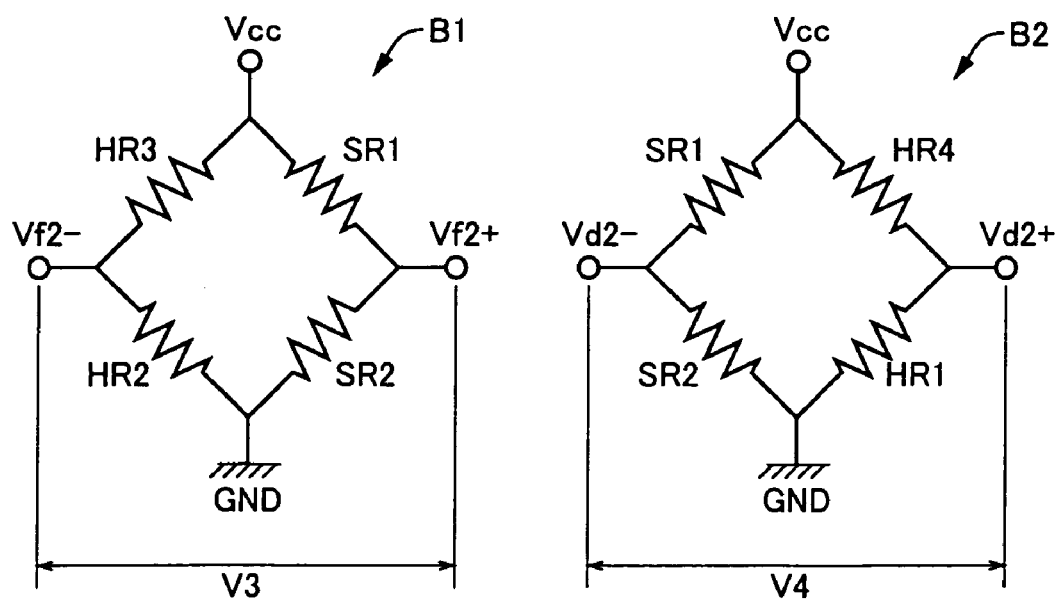
FIG. 9 is a diagram, corresponding to FIG. 4, for explaining an equivalent circuit of a main sensor unit of an other embodiment of the present invention.

FIG. 9 shows equivalent circuits in the other embodiment of the main sensor unit 12. A first bridge B1 of the present embodiment differs from the first bridge B1 of FIG. 4 in that the fixed resistors SR2 and SR1 are disposed in place of the strain resistance elements HR1 and HR4. The other portions of the first bridge B1 and the second bridge B2 are arranged in the same manner as the embodiment 1.

Figure 10:
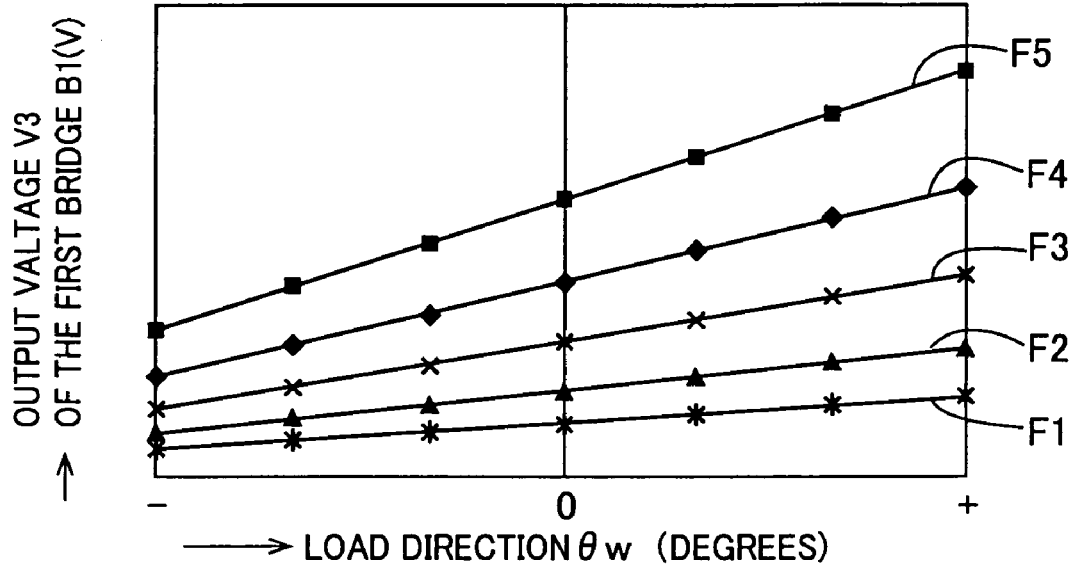
FIG. 10 is a characteristics diagram for explaining, in the first bridge shown in FIG. 9, variations of the output voltage relative to the load direction with the load as a parameter.
Figure 11:
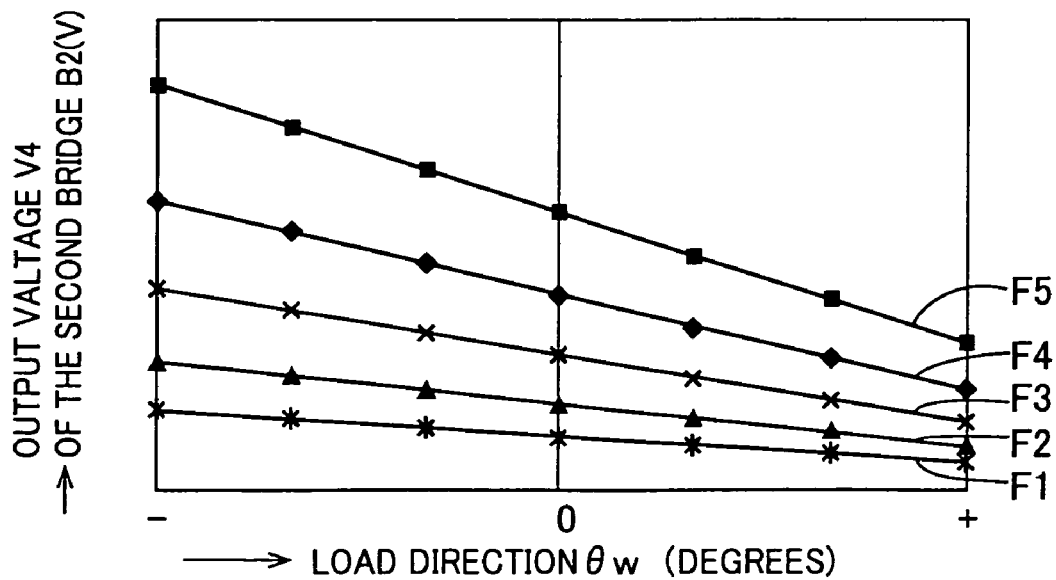
FIG. 11 is a characteristics diagram for explaining, in the second bridge shown in FIG. 9, variations of the output voltage relative to the load direction with the load as a parameter.
Figure 12:
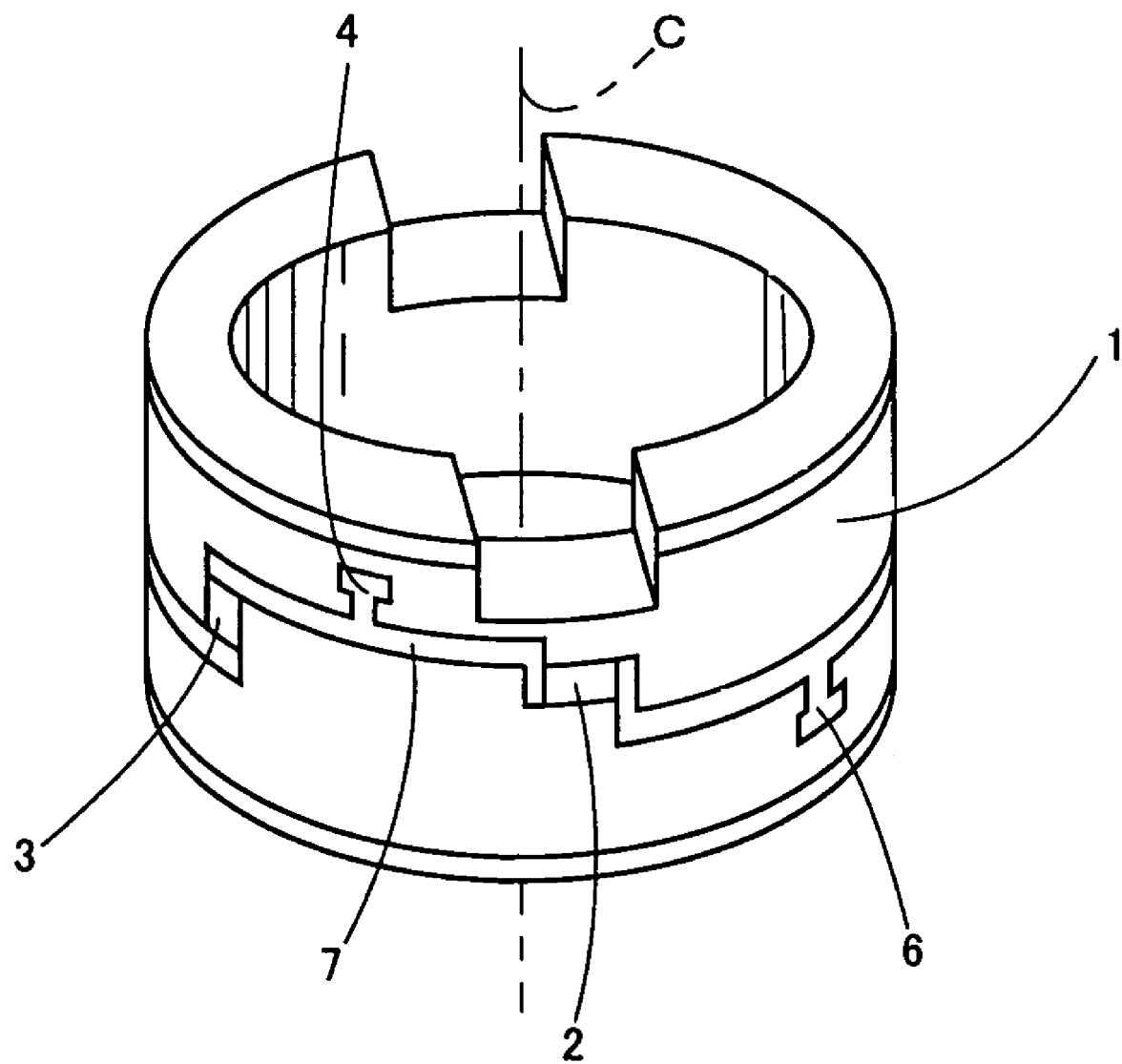
FIG. 12 is a perspective view showing a strain body disposed in a conventional main sensor unit.
Figure 13:
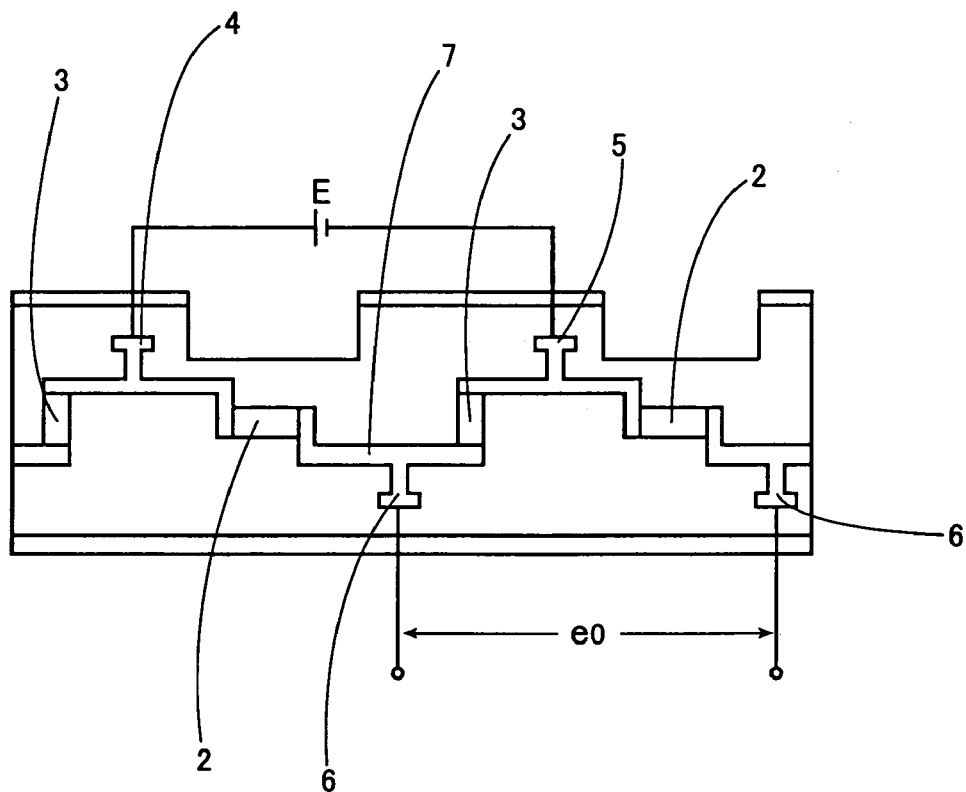
FIG. 13 shows a detecting circuit fixed to an outer circumferential surface of the strain body of FIG. 12 in a developed state.
Figure 14:
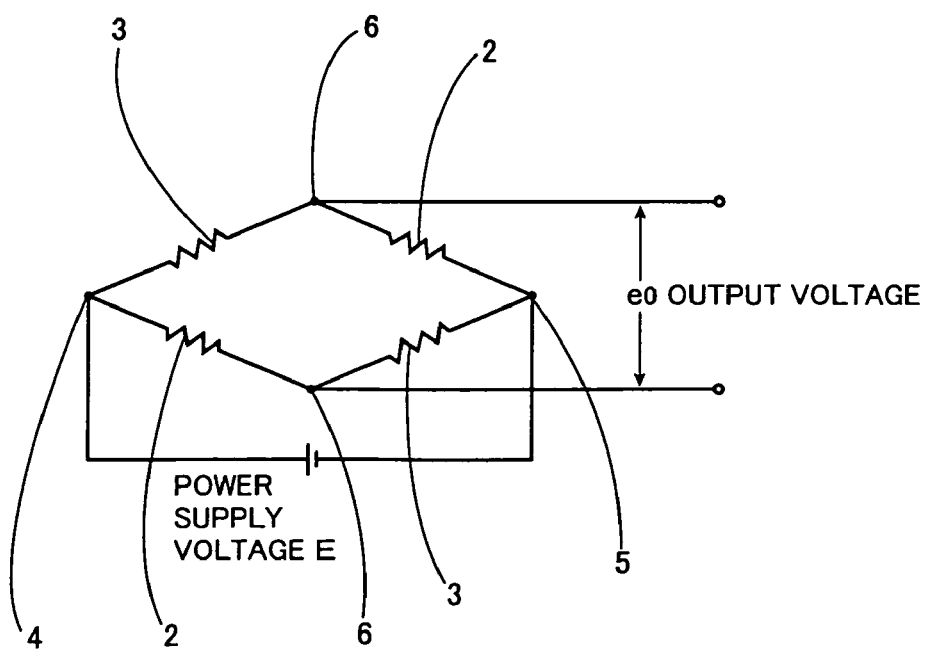
FIG. 14 is an equivalent circuit diagram for explaining a structure of the detecting circuit fixed to the outer circumferential surface of the strain body of FIG. 12.

FIG. 10 and FIG. 11 show measured values of an output voltage V3 and an output voltage V4, for the first bridge B1 and the second bridge B2 of the present embodiment. Measurement is performed in respective states where each of five kinds of fixed load values F1, F2, F3, F4 and F5 is applied to the displacing member 26 in the direction perpendicular to the axis C as the load W as shown in FIG. 2, the angle (direction) $\theta_W$ of the applied load is varied. The load values successively increase from the smallest one (F1) to the largest one (F5).

As a result, the output voltage V3 is obtained, which varies in proportion to the value of load W and varies in proportion to the angle (direction) $\theta_W$ of the applied load W. The output voltage V4 is obtained, which varies in proportion to the value of load W and varies in inverse-proportion to the angle (direction) $\theta_W$ of the applied load W. Thus, in the present embodiment, the sum value of the output voltage V3 and the output voltage V4, that is (V3+V4) has a fixed value independent from the angle $\theta_W$ of the load W, similar to FIG. 7 of the above embodiment 1.

Thus, with the present embodiment, the value of load W can be determined using the sum value (V3+V4) of the output voltages in place of the output voltage V1 of the above embodiment. Using the formula (3), the angle (direction) $\theta_W$ of the load W is calculated based on β which is a function of the sum value (V3+V4), the constant α, and the output voltage V4 (V2). Similar to the above embodiment, the constant α is not necessarily be fixed but may be corrected according to the sum value (V3+V4) of the output voltages etc., as necessary.

Although the embodiments of the present invention were described based on the drawings heretofore, the present invention can be applied in other modes as well.

For example, in the above detecting apparatus 10, the strain detecting circuit 30 is fixed to the outer circumferential surface of the strain body 20, but it may be fixed to an inner circumferential surface of the strain body 20.

Also, the first strain resistance element HR1, the second strain resistance element HR2, the third strain resistance element HR3, and the fourth strain resistance element HR4 in the above detecting apparatus 10 can be formed not only of thick film resistors but of thin film resistors as well.

As shown in FIG. 3, in the strain detecting circuit 30, the respective strain resistance elements HR1, HR2, HR3 and HR4 are positioned on the outer circumferential surface of the strain body 20 to be shifted from the width center in the width direction, in view of the positioning of the electrode (terminal) pattern etc. However, the strain resistance elements may be positioned on the outer circumferential surface at the center position in the width direction. In summary, the strain resistance elements at the upper side of the line B and the strain resistance elements at the lower side of the line B are arranged so that the former and the latter receive the stresses directed in the opposite directions.

In the detecting apparatus 10 of the above embodiments, the case member 24 is used as the first member and the displacing member 26 is used as the second member. However, the case member 24 may be used as the second member and the displacing member 26 may be used as the first member. Also, in the above embodiments, the load W is applied to the displacing member 26 and the case member 24 receives the reaction force, but the load W may be applied to the case member 24 and the displacing member 26 may receive the reaction force. The case member 24 and the displacing member 26 in the above embodiments may be variously changed depending on a mounting structure, a supporting structure, a load applied structure, as necessarily.

The first strain resistance element HR1, the second strain resistance element HR2, the third strain resistance element HR3, and the fourth strain resistance element HR4 do not necessarily have the pattern shape shown in FIG. 3. A length and/or a width ratio, and an overall shape, etc. of the pattern shape can be variously altered.

The above strain body 20 formed by the seamless stainless steel tube may be formed by joining both ends of a rectangular stainless steel plate in a longitudinal direction. The stainless steel plate may be formed into cylindrical shape, when it is welded to the mounting portion 26b of the displacing member 26 and the washer 22.

In the strain detecting circuit 30, the respective strain resistance elements HR1, HR2, HR3 and HR4 are arranged on the strain body 20 equidistantly in the circumferential direction as shown in FIG. 2. However, they are not necessarily arranged at strictly equal intervals, but may be circumferentially shifted within a certain range according to the positioning mode of the load detecting apparatus or load inputting conditions, etc.

In embodiment 2, the output voltage V4 of the second bridge B2 is used to calculate the angle (direction) $\theta_W$ of the load W. However, the angle (direction) $\theta_W$ can be similarly calculated using the output voltage V3 of the first bridge B1.

Needless to say, the present invention can be executed in other modes in which various changes and modifications are made based on the knowledge of those skilled in the art, although such other modes are not explained one by one.

What is claimed is:

1. A load and load direction detecting apparatus for detecting a load value and a load direction, comprising:

a main sensor unit which includes (i) a cylindrical strain body provided with, on a circumferential surface, at least four strain detecting elements circumferentially spaced, and (ii) a first member and a second member respectively fixed and supporting respective ends of the strain body so that a load directed perpendicular to an axis of the strain body acts on one of the respective ends of the strain body and a reaction force acts on the other end of the respective ends;

a load value calculating unit which calculates the load value using a first output signal based on a signal output from a first bridge including at least a pair of strain detecting elements positioned relative to the axis, of the at least four strain detecting elements; and a load direction calculating unit which calculates the load direction using (i) a second output signal based on a signal output from a second bridge constituted of a pair of strain detecting elements positioned relative to the axis of the at least four strain detecting elements and two fixed resistors, and (ii) the first output signal.

2. The load and load direction detecting apparatus according to claim 1, wherein the first bridge is constituted of a third strain detecting element and a second strain detecting element, and a fourth strain detecting element and a first strain detecting element, and the first output signal corresponds to a potential difference arising between a potential generated between the third strain detecting element and the second strain detecting element, and a potential generated between the fourth strain detecting element and the first strain detecting element, when a power supply voltage is applied to between the third strain detecting element and the fourth strain detecting element, and between the second strain detecting element and the first strain detecting element.

3. The load and load direction detecting apparatus according to claim 2, wherein the second bridge is constituted of a fourth strain detecting element and a first strain detecting element, and two fixed resistors, and the second output signal corresponds to a potential difference arising between a potential generated between the fourth strain detecting element and the first strain detecting element, and a potential generated between the two fixed resistors, when the power supply voltage is applied to between the fourth strain detecting element and one of the fixed resistors and between the first strain detecting element and other of the fixed resistor.

4. The load and load direction detecting apparatus according to claim 2, wherein the at least four strain detecting elements are arranged on the cylindrical strain body equidistantly in a circumferential direction, and in response to the load applied, the second strain detecting element and the fourth strain detecting element vary in an opposite direction to the third strain detecting element and the first strain detecting element, in resistance values thereof.

5. The load and load direction detecting apparatus according to claim 1, wherein the at least four strain detecting elements are arranged on the cylindrical strain body equidistantly in a circumferential direction, and in response to the load applied, the second strain detecting element and the fourth strain detecting element vary in an opposite direction to the third strain detecting element and the first strain detecting element, in resistance values thereof.

6. The load and load direction detecting apparatus according to claim 1, wherein the second bridge is constituted of a fourth strain detecting element and a first strain detecting element, and two fixed resistors, and the second output signal corresponds to a potential difference arising between a potential generated between the fourth strain detecting element and the first strain detecting element, and a potential generated between the two fixed resistors, when the power supply voltage is applied to between the fourth strain detecting element and one of the fixed resistors and between the first strain detecting element and other of the fixed resistor.

7. The load and load direction detecting apparatus according to claim 1, wherein the at least four strain detecting elements are arranged on the cylindrical strain body equidistantly in a circumferential direction, and in response to the load applied, the second strain detecting element and the fourth strain detecting element vary in an opposite direction to the third strain detecting element and the first strain detecting element, in resistance values thereof.

* * * * *

UNITED STATES PATENT AND TRADEMARK OFFICE
CERTIFICATE OF CORRECTION

| | |
|---|---|
| PATENT NO. | : 7,481,123 B2 |
| APPLICATION NO. | : 12/000275 |
| DATED | : January 27, 2009 |
| INVENTOR(S) | : Noboru Fujiwara and Akira Matsuura |

It is certified that error appears in the above-identified patent and that said Letters Patent is hereby corrected as shown below:

Claim 7, column 14, line 2, "claim 1" should read --claim 6--

Signed and Sealed this

Fifteenth Day of September, 2009

David J. Kappos
*Director of the United States Patent and Trademark Office*